(12) United States Patent
Lawson et al.

(10) Patent No.: US 8,984,850 B2
(45) Date of Patent: Mar. 24, 2015

(54) ROW INSENSITIVE BIOMASS HARVESTING AND BILLETING SYSTEM AND METHOD

(71) Applicant: CNH America LLC, New Holland, PA (US)

(72) Inventors: William T. Lawson, Raceland, LA (US); Malcolm J. Baker, Queensland (AU); Randall J. Clark, Mayville, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/722,572

(22) Filed: Dec. 20, 2012

(65) Prior Publication Data

US 2014/0174048 A1     Jun. 26, 2014

(51) Int. Cl.
| A01D 34/00 | (2006.01) |
| A01D 45/00 | (2006.01) |
| A01D 45/10 | (2006.01) |
| A01D 43/08 | (2006.01) |

(52) U.S. Cl.
CPC .............. *A01D 45/003* (2013.01); *A01D 45/10* (2013.01); *A01D 43/082* (2013.01)
USPC ........................................................ 56/13.9

(58) Field of Classification Search
CPC ....... A01D 45/10; A01D 47/00; A01D 91/00; A01D 45/003; C13B 10/06; C13B 5/02
USPC ................................ 56/63, 122, 500, 62, 13.9
See application file for complete search history.

(56) References Cited

U.S. PATENT DOCUMENTS

| 1,908,966 | A |   | 5/1933  | Falkiner et al. |
| 2,279,183 | A |   | 4/1942  | Stimatze |
| 2,516,277 | A |   | 7/1950  | Vichie et al. |
| 3,531,404 | A | * | 9/1970  | Appleberry et al. .......... 210/732 |
| 3,645,073 | A |   | 2/1972  | Gomes et al. |
| 3,673,774 | A | * | 7/1972  | Mizzi ............................. 56/13.9 |
| 3,705,481 | A |   | 12/1972 | Willett |
| 3,791,114 | A |   | 2/1974  | Fowler |
| 3,848,399 | A | * | 11/1974 | Makeham ...................... 56/13.9 |
| 3,995,520 | A | * | 12/1976 | Spargo ........................... 83/345 |
| 4,065,912 | A | * | 1/1978  | Quick ............................ 56/13.9 |
| 4,165,596 | A |   | 8/1979  | Duncan |
| 4,170,098 | A | * | 10/1979 | Moreno et al. ................. 56/13.9 |

(Continued)

FOREIGN PATENT DOCUMENTS

| WO |    2007140520    | 12/2007 |              |
| WO | WO 2013003924 A2 | * 1/2013 | ............ A01D 45/10 |

*Primary Examiner* — Árpád Fábián-Kovács
(74) *Attorney, Agent, or Firm* — Rebecca L. Henkel (57) ABSTRACT

A harvesting system and method providing a row insensitive plant cutting and gathering capability, suitable for harvesting tall, stalky plants such as sweet sorghum, cane, and the like, in high volume, which also billet cuts the harvested plants. Multiple plants are cut simultaneously on a continuous basis at any locations across a header of the system, and the cut plants are gathered into a continuous overlapping flow having a vertical extent or thickness of several stalks or canes and their associated foliage. The flow is then vertically compacted into a mat of reduced thickness while being conveyed into a billet cutter, which cuts the stalks or canes into billets of a desired length and discharges the billets to a desired location, all while the harvester is moving through a field harvesting. The system can be incorporated into a conventional sugarcane harvester in place of conventional base cutters and row dividers.

19 Claims, 12 Drawing Sheets

(56) References Cited

U.S. PATENT DOCUMENTS

| | | | |
|---|---|---|---|
| 4,270,337 A * | 6/1981 | Pinto | 56/13.9 |
| 4,470,244 A | 9/1984 | Leigers | |
| 4,722,174 A | 2/1988 | Landry et al. | |
| 4,897,986 A * | 2/1990 | Baker et al. | 56/13.9 |
| 4,924,662 A * | 5/1990 | Quick | 56/12.8 |
| 5,031,392 A * | 7/1991 | Baker | 56/13.9 |
| 5,157,904 A * | 10/1992 | Otten et al. | 56/2 |
| 5,191,759 A * | 3/1993 | Baker | 56/500 |
| 5,414,981 A | 5/1995 | Landry et al. | |
| 5,463,856 A | 11/1995 | Beckwith | |
| 5,485,716 A | 1/1996 | Baker | |
| 6,062,009 A | 5/2000 | Caillouet | |
| 6,272,819 B1 * | 8/2001 | Wendte et al. | 56/11.9 |
| 6,363,700 B1 * | 4/2002 | Fowler | 56/13.9 |
| 6,500,062 B1 * | 12/2002 | Harris et al. | 460/79 |
| 6,508,049 B1 * | 1/2003 | Cox et al. | 56/10.2 R |
| 6,807,799 B2 | 10/2004 | Reaux | |
| 8,230,668 B2 * | 7/2012 | Hinds | 56/53 |
| 8,230,669 B2 * | 7/2012 | Hinds | 56/53 |
| 8,240,115 B2 * | 8/2012 | Marchini | 56/63 |
| 8,578,688 B2 * | 11/2013 | Hinds | 56/102 |
| 2005/0034439 A1 | 2/2005 | Galea | |
| 2007/0163606 A1 * | 7/2007 | Chojnacki et al. | 131/111 |

* cited by examiner

ROW INSENSITIVE BIOMASS HARVESTING AND BILLETING SYSTEM AND METHOD

TECHNICAL FIELD

This invention relates generally to a system and method for harvesting and billeting plants for biomass and energy production and the like, and more particularly, which is operable to cut stalky plants, such as varieties of sweet sorghum, as well as canes, in a high volume, row insensitive manner over the width of the front end of the harvester, and which conveys and contains the mass of cut stalks or canes including leaves and other foliage together until the stalks are cut into billets, then directs and discharges a flow of the billets to a desired location. The system can also include cleaning apparatus configured and operable for separating a desired portion of the leaves from the billets prior to discharge from the system, as desired, for improved handling and preservation of desired properties of the harvested plants.

BACKGROUND ART

Harvesting densely planted, tall, stalky plants, including, but not limited to, sweet sorghum, for biomass and energy has long been known. Commonly, conventional harvesters have been used for harvesting sorghum, including grain, forage, and sugarcane type harvesters, each having advantages and disadvantages. With sorghum, sugars contained in the stalks is a sought after element of the plant. However, it has been found that an undesirable amount of the juices containing the sugars can be lost or the juices undesirably degraded if the stalks are chopped into small bits and stored in that state prior to the extraction process. It has also been found that sorghum stored in small chipped form can generate undesired levels of heat when stored. It is therefore desired to harvest sorghum in a manner that preserves more of the juices in the harvested plant. A challenge of harvesting sorghum is that the harvesting season can be many months long per year and any harvester used should be designed for a relatively high annual duty cycle. Another challenge is that sorghum is sometimes relatively densely planted compared to similar tall plants such as sugarcane, and use of a conventionally configured sugarcane harvester for harvesting sorghum can be slower than desired.

Examining the various types of harvesters used for sorghum, known grain type harvesters are advantageous as they allow harvesting wide swaths of crop in a row insensitive manner, that is, at any location across a width of a header of the combine, without need for alignment with the rows of plants being harvested, and can rapidly process the resulting large mass of harvested crop material. Grain harvesters can also collect the grain separately of stalks and other crop residue. Disadvantages include that grain harvesters typically are constructed to operate on relatively small annual duty cycles, and are not known to have a suitable manner of preserving juices in the harvested stalks. Crop material flow through a typical grain harvester additionally is in the form of a non-sequential mixture of crop material, including stalks, leaves, grain, and other portions of the plant, wherein the stalks are not deliberately oriented in any particular direction. As a result, the stalks are not adequately aligned in a manner to facilitate cutting into billets of a particular length or range of lengths with desired uniformity.

Forage harvesters are advantageous as they can also harvest in a row insensitive manner, that is, cut crops at any and all locations across the width of a header of the harvester, and can induct a high volume mass of cut crop material from the header into the harvester. Forage harvesters also have a large capacity rotary cutter or chopper that can rapidly chip or cut the received crop material into small chips or particles, e.g., smaller than a kernel of maize or corn, suitable for conveying using pneumatic systems. Disadvantages of known forage type harvesters include that that they too have a relatively short annual duty cycle, and the chipping type rotary cutter is not adapted for cutting stalks in a manner to produce billets of a desired length found to best preserve juice, e.g., in a range of from about 100 to about 500 millimeters.

Sugarcane harvesters are advantageous as they have a relatively long duty cycle, and they billet the cane, including in the above stated range, if desired. Some sugarcane harvesters also have a capability to clean or remove leaves from the stalks in a variable manner so that the amount of remaining leaves on the stalks can be controlled, which may be desirable. However, cane harvesters are disadvantageous as they are row sensitive, that is, the apparatus or header for cutting and inducting the canes into the harvester requires alignment with a limited number of the rows of canes spaced a certain distance apart during movement over the field. This is required to enable processing of the cut canes in a sequential, end to end order wherein the plants are individually stood up, topped (removal of top foliage) and base cut (base of canes severed from ground at or near ground level), by the harvester as necessary for harvesting desired portions of the plants. For purposes of harvesting sweet sorghum and some other tall stalky plants for biomass or energy production, this degree of processing is unnecessary and would serve to increase harvesting time and decrease productivity. As another disadvantage, sugarcane cultivation is well known and the row spacings between sugarcane plants are presently uniform at either 1.4 meter or 1.8 meter, and in some limited instances narrower spacings, whereas row spacing for sweet sorghum and other plants to be used for energy production have not been standardized yet.

Reference Caillouet U.S. Pat. No. 6,062,009, issued May 16, 2000, which discloses a representative row sensitive apparatus and method for harvesting cane and cutting the cane into billets. The Caillouet apparatus is configured for topping, base cutting, inducting, cleaning, and billeting two rows of cane simultaneously. The Caillouet apparatus utilizes side by side chain gatherers for receiving and holding canes of each of the two rows in a generally vertical semi-erect orientation for topping and base cutting by a rotary base cutter located below the rear end of the gatherers, and a turn around device for moving the canes laterally and throwing the topped ends down away from the harvester, for induction into the harvester cut base end first, in sequential order for subsequent stripping and billeting. Stripping or cleaning apparatus is located in a middle area of the harvester and strips leaves from the canes as they transition from the base cutter to an inclined lifting conveyor that conveys the canes in end to end sequential order upwardly and rearwardly to a billet cutter. The billet cutter cuts or severs the canes sequentially as they are conveyed by and propelled from the end of the lifting conveyor to a further cleaning device, receiving container, or other location.

As a disadvantage, the Caillouet apparatus is not configured to cut canes or stalks in a row insensitive manner, nor is it contemplated to billet cut a large number of canes simultaneously. In this latter regard, although more of a limitation than a disadvantage, many known billet cutters utilize parallel rotating drums having knives running the length of the drum at angularly spaced locations about their circumference, respectively, the knives of the respective drums cooperating with the other drum for cutting canes or stalks captured between the drums to certain lengths. This requires the width of the gap between the drums to closely match the thickness or width of the canes or stalks to be cut, to ensure that the canes are completely cut through, and not allowed to pass through uncut or only partially cut.

It would be desirable to develop a harvesting system and method that provides the annual duty cycle and billet cutting capabilities of sugarcane harvesters, with a row insensitive plant cutting and gathering capability, suitable for harvesting tall, stalky plants such as sweet sorghum, cane, and the like, which overcomes one or more of the disadvantages and limitations set forth above.

SUMMARY OF THE INVENTION

What is provided is a harvesting system and method that provides the annual duty cycle and billeting capabilities of sugarcane harvesters, with a row insensitive plant cutting and gathering capability, suitable for harvesting tall, stalky plants such as sweet sorghum and the like, which overcomes one or more of the disadvantages and limitations set forth above.

According to a preferred aspect of the invention, the system can cut multiple, that is, two or more, including routinely 3 or 4, stalky plants or canes at any location across the width of a header of the system, and gather the cut stalks into a continuous overlaying or overlapping flow having a vertical extent or thickness of several stalks or canes, e.g., routinely 3 or more, and their associated foliage. The system then vertically compacts the flow into a mat of reduced thickness while conveying it to a billet cutter; then cut the stalks or canes of the mat into billets of a desired length, and discharge the billets to a desired location, all while moving through a field and harvesting.

According to a preferred aspect of the invention, the harvesting system and method utilize a crop cutting header carried on the front end of a frame of the harvester, configured and operable for cutting any number of stalks or canes within a frontal area or extent of the header. A suitable header can comprise, but is not limited to, a conventional commercially available drum type forage harvester header, such as those available from Maschinenfabrik KEMPER GmbH & Co. KG of Germany. The preferred header has several large diameter rotating cutter drums across its forwardmost edge so as to be capable of simultaneously cutting stalks or canes encountered at any location across the width of the header, and includes gathering apparatus operable in cooperation with the cutters for rapidly laying down the cut stalks or canes in overlapping relation to each other on the header externally of the harvester frame, gathering them into a rearward flow, and rapidly and continuously conveying the flow rearwardly into an inlet opening on the front end of the harvester.

According to another aspect of the invention, the inlet opening connects with a feed passage extending rearwardly along or within the frame, and is bounded by a pair of powered feed rollers similar to or the same as those used in the inlet opening of a conventional cane or forage harvester, or those used in connection with a header such as the Kemper header just discussed. However, differing from a forage harvester that typically includes a rotary chipper in close proximity to the powered feed rollers for virtually immediately cutting or chopping the incoming flow, the present invention utilizes a sequence of transfer rollers bounding the feed passage, preferably comprising a vertically spaced apart array of horizontal transfer rollers, configured and operable for continuously conveying the flow of overlapping stalks or canes rearwardly and then upwardly through the feed passage, while substantially continuously pressing down on the flow to contain and compact it to reduce its vertical extent or height to form the flow into a denser mat having a desired thickness of just a few stalks or canes, without exerting sufficient pressure to crush or compress the individual stalks or canes so as to force out significant amounts of juice within the harvester, or damage them in a manner so as to leak significant amounts of juices during subsequent handling and storage. This compacted mat is then conveyed to a billet cutter adjacent the last transfer roller, which cuts the stalks or canes into billets of a desired length range.

In the above regard, it should be noted that, at this point in the process, leaves will not have been significantly removed from the stalks or canes, and thus comprise a portion of the flow. It is these leaves and other foliage that are desirably compressed by the series of transfer rollers, to bring the stalks or canes closer together prior to cutting by the billet cutter. This compacted state is advantageous and necessary, as the stalks or canes are better exposed for cutting and are less likely to pass through the billet cutter uncut or only partially cut, or to jam up prior to entry into the billet cutter.

In light of the above, as a preferred embodiment to achieve the desired reduction in thickness of the flow, at least an initial or horizontal forward portion of the sequence of transfer rollers comprise a transfer roller unit including an array of lower rollers and upper rollers, arranged in a vertically offset manner, that is, without the upper rollers being disposed directly over the lower rollers. The upper rollers are optionally supported to allow vertical movement, preferably about an offset pivot, so as to be biased downwardly by their own weight. As an additional option, yieldable biasing elements such as springs or the like, or an adjustment mechanism utilizing drivers such as cylinders, can be used if desired or required for providing a desired level of compaction of the flow for forming it into the mat. This optional ability to move vertically enables the rollers to individually self adjust height wise, for changing a vertical extent or height of the feed passage at that location to accommodate variances in the thickness and also density of the crop flow, while still acting to press down on and reduce the thickness of the flow while maintaining the required rearward movement or throughput. As another advantage, this allows the relatively long stalks or canes to make a relatively smooth transition from generally horizontal to an upwardly inclined orientation without damage, e.g., severe bending, crushing, etc., that could result in jamming or plugging the feed passage.

As an operational example, the initially relatively thick or tall flow of stalks or canes, which, as a non-limiting example, can have a cut length of 3 meters or more, is driven rearwardly by the feed rollers, into the feed passage between the upper and lower rollers of the transfer roller unit. These rollers exert the initial vertical compacting force or pressure against the flow to flatten it, mainly to compact the associated foliage, e.g., leaves. In this regard, it should be noted that the stalks do not enter the feed passage in a single file sequential end to end order such as with a sugarcane harvester. As a result, the stalks or canes will overlap longitudinally, and some can be diagonally oriented so as to cross others. As a result, the rear or downstream ends of some of the stalks or canes that have passed between more rollers can be initially more compacted than the forward or upstream ends. To facilitate throughput, at least some of the rollers preferably have suitable surface features such as cleats or ribs, at locations about their outer circumference, configured to grab the stalks for conveying them rearwardly.

According to a further preferred aspect of the invention, a rear section of the sequence of transfer rollers comprises an upwardly and rearwardly inclined lifting conveyor, which can also include rollers having cleated or ribbed outer circumferences, for grabbing the stalks or canes of the mat for conveying it upwardly and rearwardly to the billet cutter. These rollers are spaced vertically apart by a distance that maintains or further reduces the vertical extent of the mat, so as to be of suitable height for induction and cutting by the billet cutter.

According to still another preferred aspect of the invention, the billet cutter is disposed adjacent to the upper end of the lifting conveyor, and is configured and operable for cutting the stalks or canes into billets of a desired length, preferably in a range from about 100 to about 500 millimeters. The billet cutter and lifting conveyor are preferably of conventional, commercially available construction and operation such as are provided on sugarcane harvesters. The system can also use a frame of a sugarcane harvester. As a result, as a non-limiting example, the frame, lifting conveyor, and billet cutter can comprise elements of a self propelled sugarcane harvester commercially available from manufacturers including, but not limited to, CNH Global N.V. under the Case IH brand. Additionally, if stripping or cleaning of the stalks is desired, commercially available cleaning apparatus from the associated sugarcane harvester can be adapted as necessary and located, for instance, adjacent the end of the billet cutter for receiving the billets and associated leaves and other plant matter, and centrifugally separating them to a desired extent.

As a further preferred aspect of the invention, the forwardly located feed rollers and horizontal transfer rollers can be incorporated and packaged as a unit that is installable in an existing sugarcane harvester frame, for instance, but not limited to, at least some of those available from CNH Global N.V. under the Case IH brand, in place of strippers and base cutters used for harvesting sugarcane, and a row insensitive header can be mounted to the front end in place of the row dividers and associated apparatus for standing up, topping, and holding sugarcanes for basecutting, to provide the features and capabilities of the present invention.

DETAILED DESCRIPTION OF THE INVENTION

Figure 1:
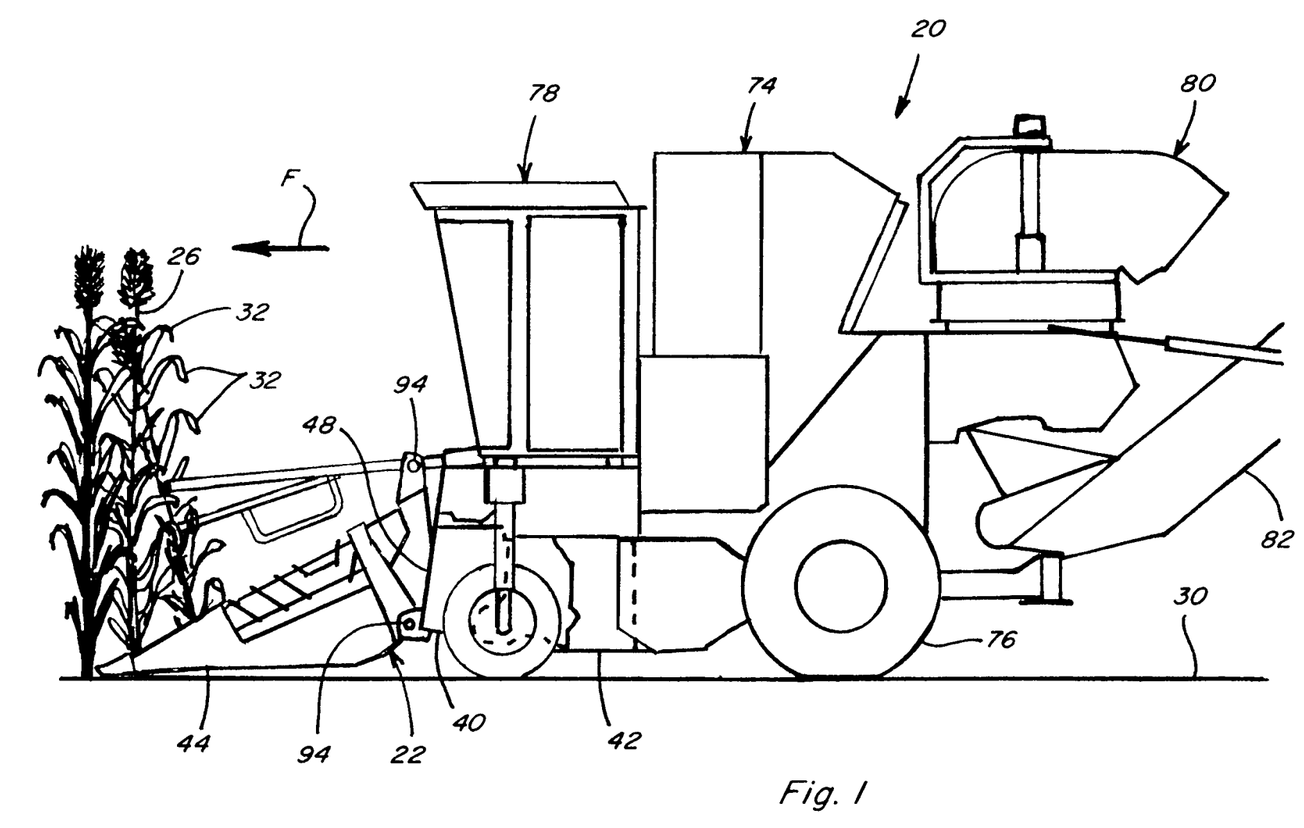
FIG. 1 is simplified side view of a row insensitive biomass harvester incorporating the invention, shown in position for harvesting a representative plant.

Referring now to the drawings, in FIG. 1 a harvester 20 incorporating apparatus and a harvesting system of the invention that provides the annual duty cycle and billeting capabilities of a sugarcane harvester in combination with a row insensitive plant cutting and gathering capability, suitable for harvesting tall, stalky plants such as sweet sorghum and the like, is shown.

Figure 2:
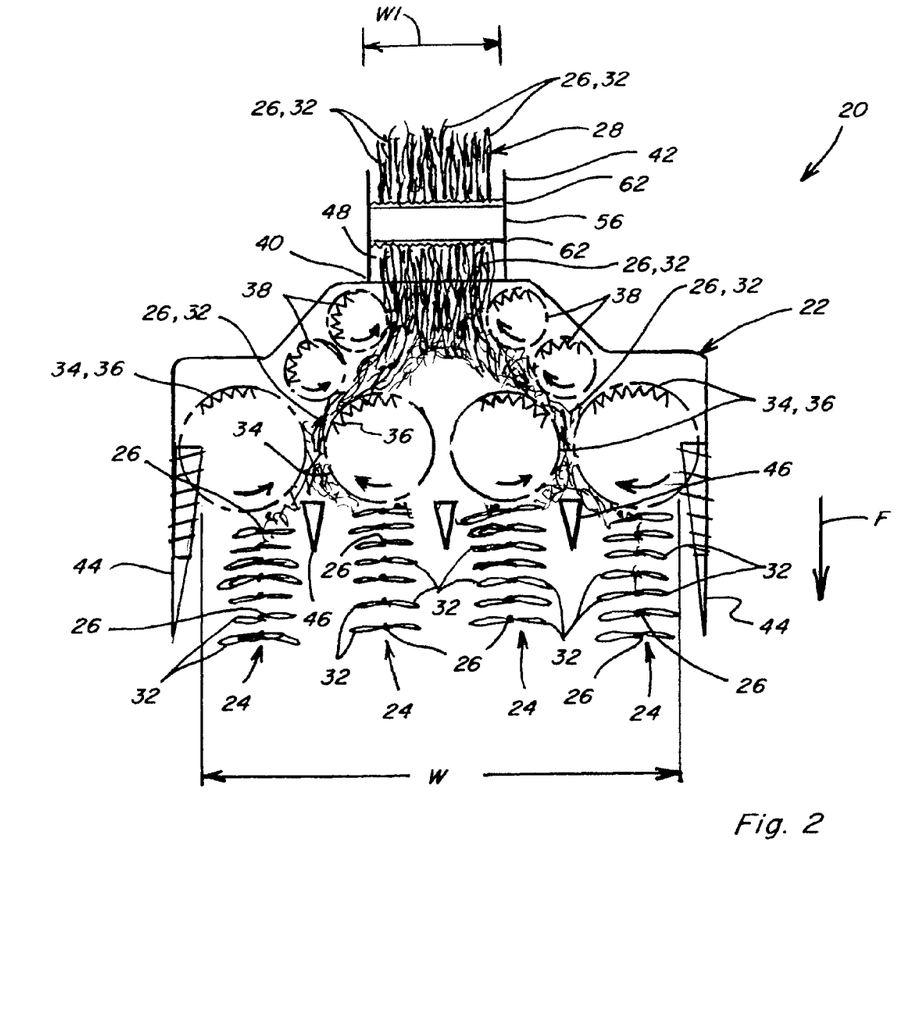
FIG. 2 is a simplified top view of a header on a forward end of the harvester of FIG. 1, shown cutting multiple plants from the ground across a width of the header, gathering the cut plants, and inducting them into the forward end of the harvester.
Figure 3:
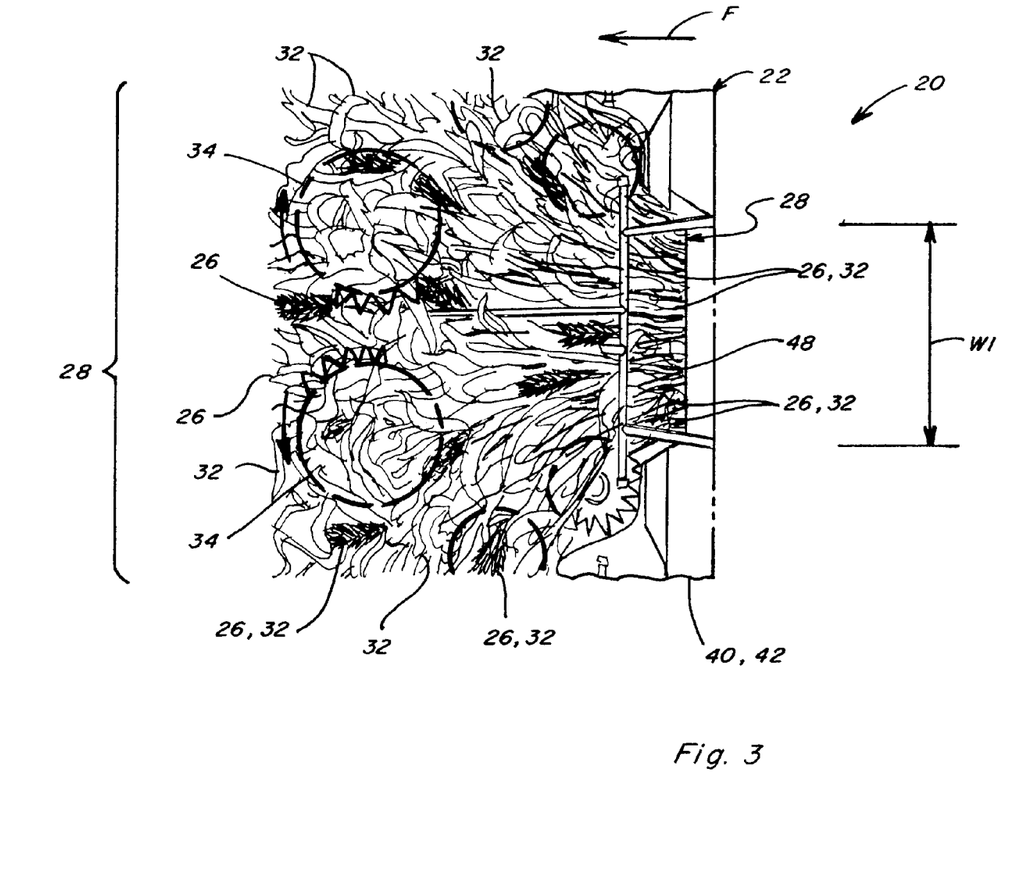
FIG. 3 is an enlarged fragmentary top view, showing gathering of the multiple plants in overlapping relation as they are inducted into the forward end of the harvester.
Figure 4:
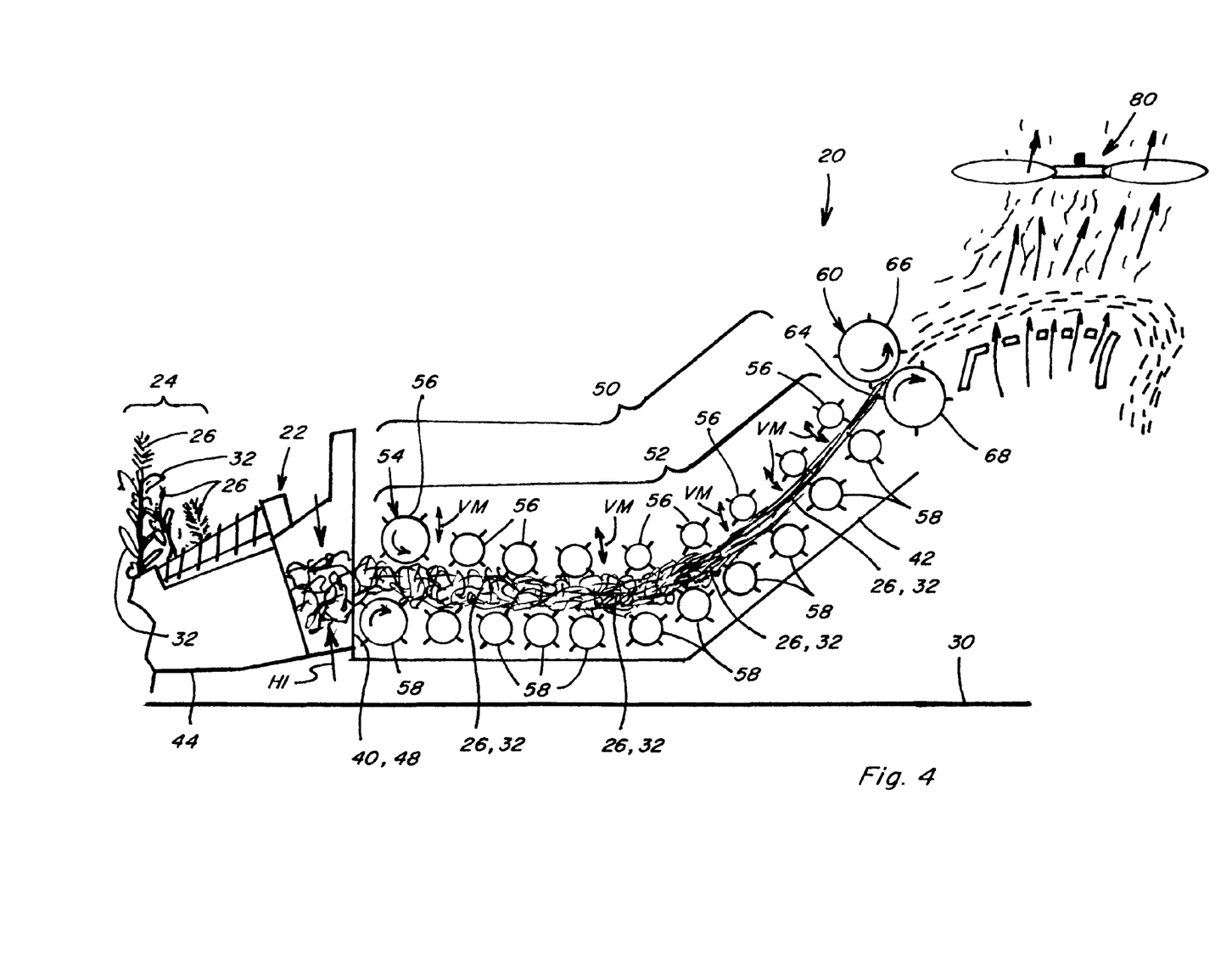
FIG. 4 is a simplified schematic representation of aspects of the harvester, showing flow of the cut plants through a feed passage of the harvester by a transfer roller conveyor system of the invention and into a billet cutter shown cutting the plants into billets of a desired length and discharging them from the harvester.

Referring also to FIGS. 2 through 4, a header 22 of harvester 20 is illustrated simultaneously cutting multiple rows 24 or random stands of upstanding, tall stalks 26 of plants across a width W of header 22, close to a ground surface 30 as harvester 20 moves in a forward direction F over the ground. Header 22 is configured such that as stalks 26 are cut, they are automatically laid down in overlapping or overlaying relation, on header 22 with their foliage 32 (leaves, pods, heads, etc.), still largely intact and attached to the cut stalks, forming a rearward flow 28 of the overlapping cut stalks 26. Header 22 is row insensitive, that is, it is not required to follow a row or rows of plants, or to cut a row of plants in sequential order, and will cut any plant or plants, at any location across the width W. Here, as illustrated in FIG. 2, width W of header 22 encompasses 4 rows of the plants, but could be configured to encompass more or fewer rows, as desired or required for a particular application, at any row spacing.

Referring more particularly to FIG. 2, to provide the above capability, irrespective of spacing or number of rows, header 22 comprises a plurality of generally flat cutter disks 34 arrayed in side by side relation across a forwardmost edge thereof, having knives 36 about the circumferences of the disks, and which disks are rotated as denoted by the associated arrows. The rotation of the disks 34, combined with the forward movement of harvester 20, causes the cut stalks 26 to fall rearwardly in overlapping or overlaying relation to each other onto the disks in a continuous manner, and at the same time, be gathered to the center of header 20 and conveyed rearwardly in a continuous flow 28 toward a forward end 40 of a frame 42 of harvester 20. For this purpose, header 20 additionally preferably includes a plurality of serrated gathering disks 38 rearwardly of cutter disks 34, and rotated as indicated by the associated arrows for cooperating with the rotating cutter disks 34 to guide flow 28 of stalks 26 rearwardly in overlapping relation and toward the center of forward end 40 of harvester 20.

As a non-limiting example, a suitable header 20 can comprise various well known drum type forage harvester headers commercially available from Maschinenfabrik KEMPER GmbH & Co. KG of Germany. Header 22, because rotating cutter disks 34 essentially span the entire width W (which can equal several meters) and can cut stalks, canes or other plants at any location across width W, is row insensitive. Header 22 additionally includes dividers 44 at the sides operable for separating standing plants for cutting by disks 34 from plants not to be cut, and guards 46 disposed adjacent to the front ends of disks 34 against which the stalks are pressed as they are cut by rotating knives 36.

Additionally in regard to header 22, flow 28 of overlaying stalks 26 will generally have a width W1 that will be a fraction of the extent of width W, and will have an initial height H1 as it reaches the forward end 40 of frame 42. As non-limiting examples, width W1 can be on the order of about 1 meter or less, and height H1 about 0.7 meter or less.

Frame 42 of harvester 20 includes a forwardly facing inlet opening 48 at a central location in forward end. Inlet opening 48 is sized and shaped to have the capacity to receive flow 28 and thus will have a width and height equal to or marginally greater than W1 and H1. Inlet opening 48 connects with a feed passage 50 extending rearwardly through frame 42.

Frame 42 carries a powered transfer roller unit 52 comprising a powered forward roller set 54 including a rotatably driven upper roller 56 spaced above a counter-rotatably driven lower roller 58, bounding and defining inlet opening 48 therebetween, and which functions to grasp and pull the gathered stalks rearwardly through the inlet opening into feed passage 50. Transfer roller unit 52 includes a series of additional vertically spaced apart, powered counter rotating upper rollers 56 and lower rollers 58 disposed at appropriate locations along feed passage 50 for conveying flow 28 rearwardly and upwardly to a billet cutter 60.

It should be observed and kept in mind that unlike a forage harvester that almost immediately chips the stalks, in this invention it is desired to preserve the integrity of stalks 26 until cut into billets of a desired length or length range. An important reason for cutting into billets as opposed to chipping is the desire to preserve juices in stalks 26 for use as biomass, and thus it is important not to significantly damage the stalks, e.g., bend, split, and/or crush, prior to billeting. To facilitate this purpose, flow 28 of overlapping stalks 26 is advantageously conveyed through passage 50 while being substantially continuously supported, so as to avoid significant possibility of bending or damage, and toward the rear is gently curved and directed upwardly along an incline and fed into billet cutter 60, this latter part in the manner of a conventional sugarcane harvester but with an important difference. That is, while sugarcanes are easily fed in an end to end, largely non-overlapping single file manner to the billet cutter, here, the multiple overlapping stalks 26 and their attendant foliage 32, are at least initially too great in overall vertical extent to enter a billet cutter, and thus must be vertically compacted in a manner that does not disrupt the continuous flow nor damage the stalks.

To accomplish positive continuous conveyance of the overlapping stalks 26, various or all of rollers 56 and 58 can include slats or cleats 62 extending sidewardly therealong and radially outwardly therefrom at spaced locations thereabout, or other suitable elements, for grasping and propelling the stalks 26 along passage 50. Because of the overlapping configuration of stalks 26 and entanglement of the attached foliage 32, stalks not contacted by a cleat or cleats 62, e.g., located toward the vertical middle region of the flow 28, will still be carried rearwardly with the flow without requiring crushing the flow to any potentially damaging extent.

Figure 5:
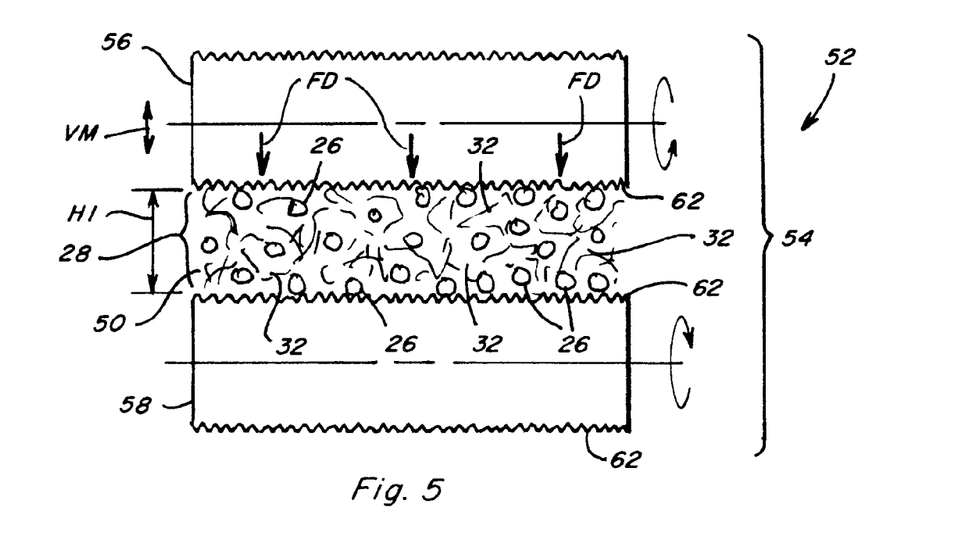
FIG. 5 is a simplified schematic frontal view of a representative pair of forwardly located transfer rollers of the conveyor system of the invention, showing the flow of cut plants therebetween.
Figure 6:
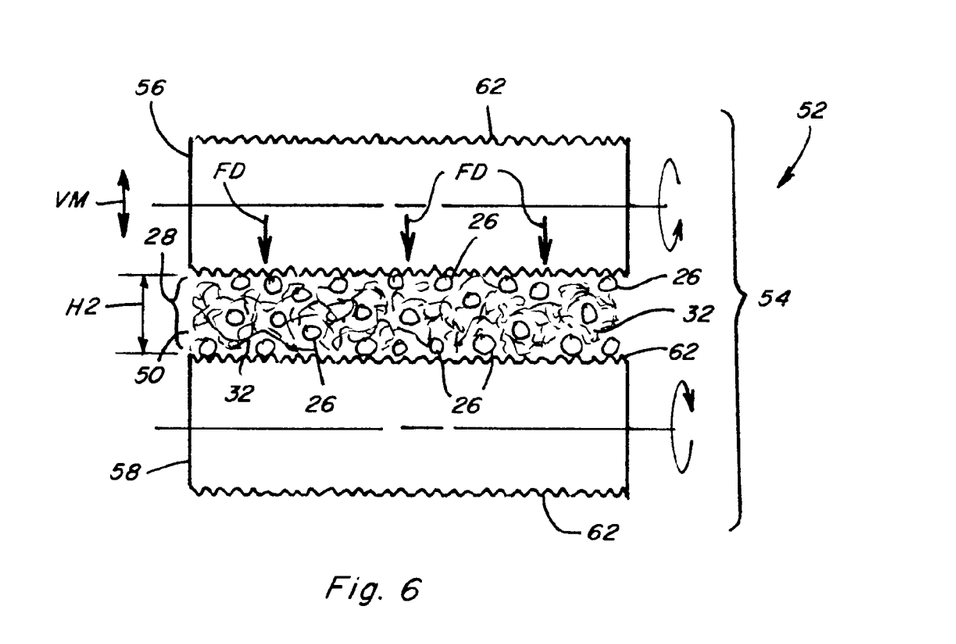
FIG. 6 is a simplified schematic frontal view of a representative pair of intermediate transfer rollers of the conveyor system of the invention, showing the flow of cut plants vertically compacted therebetween.
Figure 7:
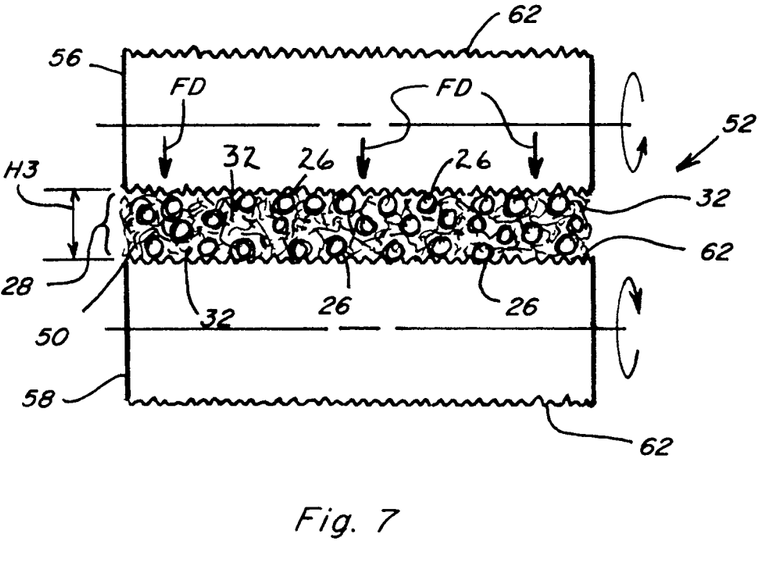
FIG. 7 is a simplified schematic frontal view of a representative pair of rearward transfer rollers of the conveyor system of the invention, showing the flow of cut plants more greatly vertically compacted therebetween.

Referring also to FIGS. 5, 6, and 7, it is necessary to gradually vertically compact flow 28 as it moves rearwardly toward billet cutter 60, as illustrated by differences between the height H1 of flow 28 between upper and lower rollers 56 and 58 of forward roller set 54 (FIG. 5); a height H2 between an intermediate pair of rollers 56 and 58 (FIG. 6); and a height H3 between a more rearward pair of rollers 56, 58 (FIG. 7). Essentially, for smooth and continuous feed into and cutting by billet cutter 60, it is required that flow 28 comprise a generally flat mat having a thickness about equal to or marginally larger than or a gap 64 between upper and lower drums 66 and 68 of billet cutter 60, or be sufficiently small so as to be adequately further compacted by drums 66 and 68, when entering the cutter. In this regard, it is contemplated that gap 64 will be just a few centimeters in height and may be variable, either in a powered manner or utilizing gravity or the like, but in any event, will be substantially less than initial height H1 of flow 28. To achieve this compaction, preferably some or all of upper rollers 56 will be supported so as to be vertically movable, as denoted by arrows VM in FIGS. 4, 5, 6, and 7, and can be weighted or have sufficient inherent weight to press down on flow 28, as denoted by arrows FD, in a manner to vertically compact it, in a generally gradual manner as it progresses rearwardly through passage 50 toward billet cutter 60. As an option, an actuator or driver can be provided in connection with one or more of the rollers to positively exert an external component of force FD against flow 28, if desired or required for a particular application.

It can be observed that the decreased vertical extent of flow 28 achieved for entry into gap 64 of cutter 60, e.g., height H3, is more the result of compaction of foliage 32, not stalks 26, and the flow is preferably maximally compacted only as it approaches cutter 60 (comparing FIGS. 5 and 7), and to an extent that facilitates completely severing by not significantly crushing stalks 26. The lesser initial compaction is advantageous and desired to allow flow 28 to make the transition from horizontal to inclined in a manner to largely preserve the integrity of stalks 26. Generally, FIG. 6 depicts any of the pairs of rollers 56 and 58 at about the transition from the horizontal to the incline, and FIG. 7 generally depicts a set of rollers 56 and 58 on the incline close to billet cutter 60, although it should be understood that the degree of compaction along passage 50 will vary with many factors, including, but not limited to, volume of foliage present, moisture content, number of stalks in any given cross section of the flow, etc.

Figure 8:
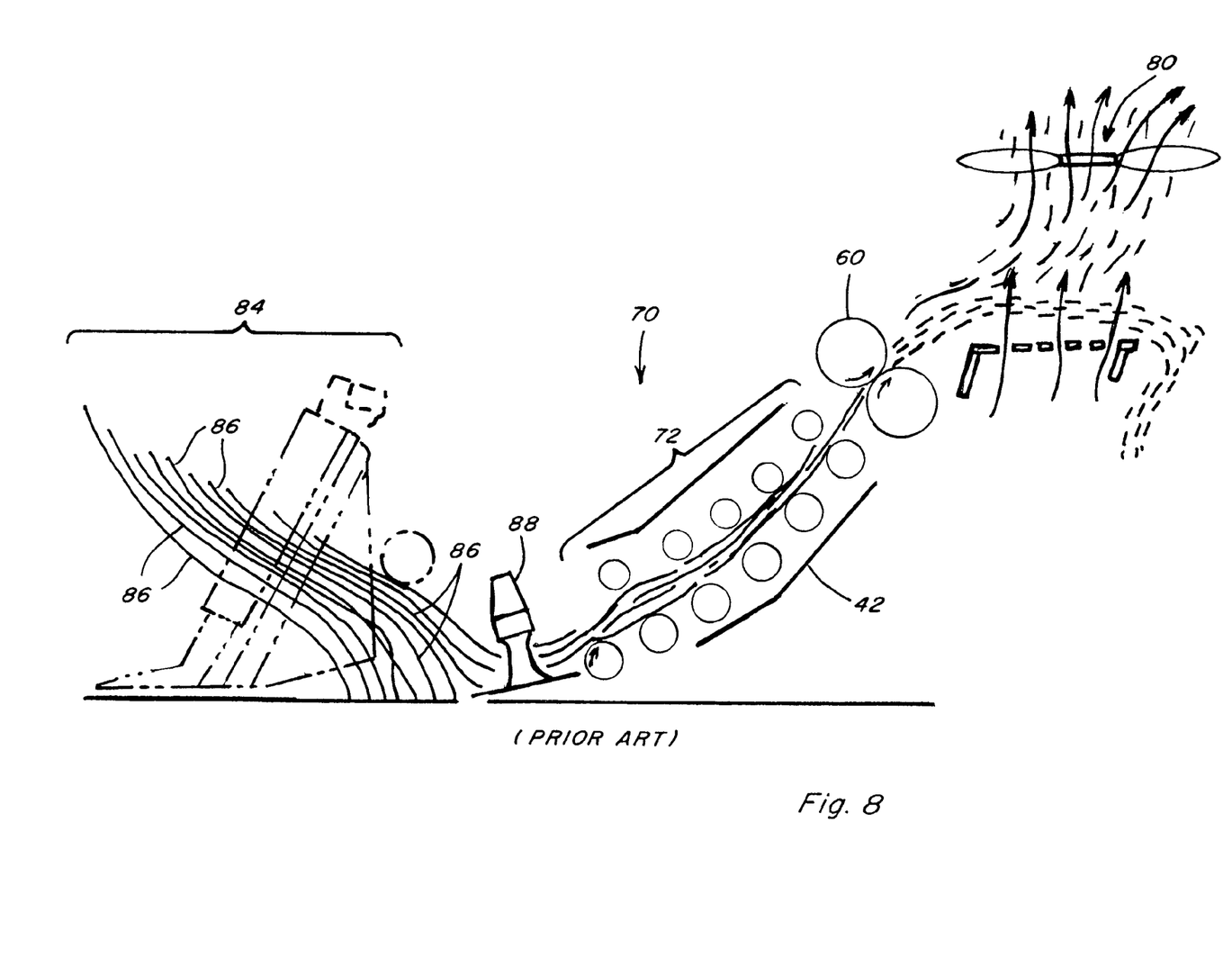
FIG. 8 is a simplified schematic representation of aspects and operation of a representative prior art row sensitive sugarcane harvester.

Referring more particularly to FIGS. 1 and 4, and also to FIG. 8, as a preferred aspect of the invention, basic frame 42 is from a commercially available sugarcane harvester, such as, but not limited to, self-propelled sugarcane harvesters represented by harvester 70, such as commercially available from CNH Global N.V. under the Case IH brand. More particularly, the upper and lower rollers 56 and 58 on an inclined lifting conveyor 72 of transfer roller unit 52, and billet cutter 60, or at least the basic configuration of those apparatus, comprise those of the commercially available frame, adapted as required for accommodating the flow of multiple overlapping stalks 26 and associated foliage 32 of plants desired to be harvested for biomass, instead of end to end flow of individual sugarcanes. Other aspects of the existing sugarcane harvester 70 preferably used include its propulsion and power system 74, drive train 76, operator cabin and controls 78 (all shown in FIG. 1), cleaning system 80 (shown also in FIGS. 4 and 8), and an optional billet conveyor 82 for carrying the cut billets from harvester 20 or 70, all of which are of well known construction. Elements of a sugarcane harvester 70 not used include its apparatus 84 for cutting and inducting canes 86 into the harvester, and base cutters 88.

Header 22 is configured to replace apparatus 84 on the front end of the harvester, and attaches to forward end 40 in a suitable manner, such as using pinned connections 94 in the conventional manner (see FIG. 1) and one or more fluid cylinders or other actuators for controlling height and/or tilt.

Figure 9:
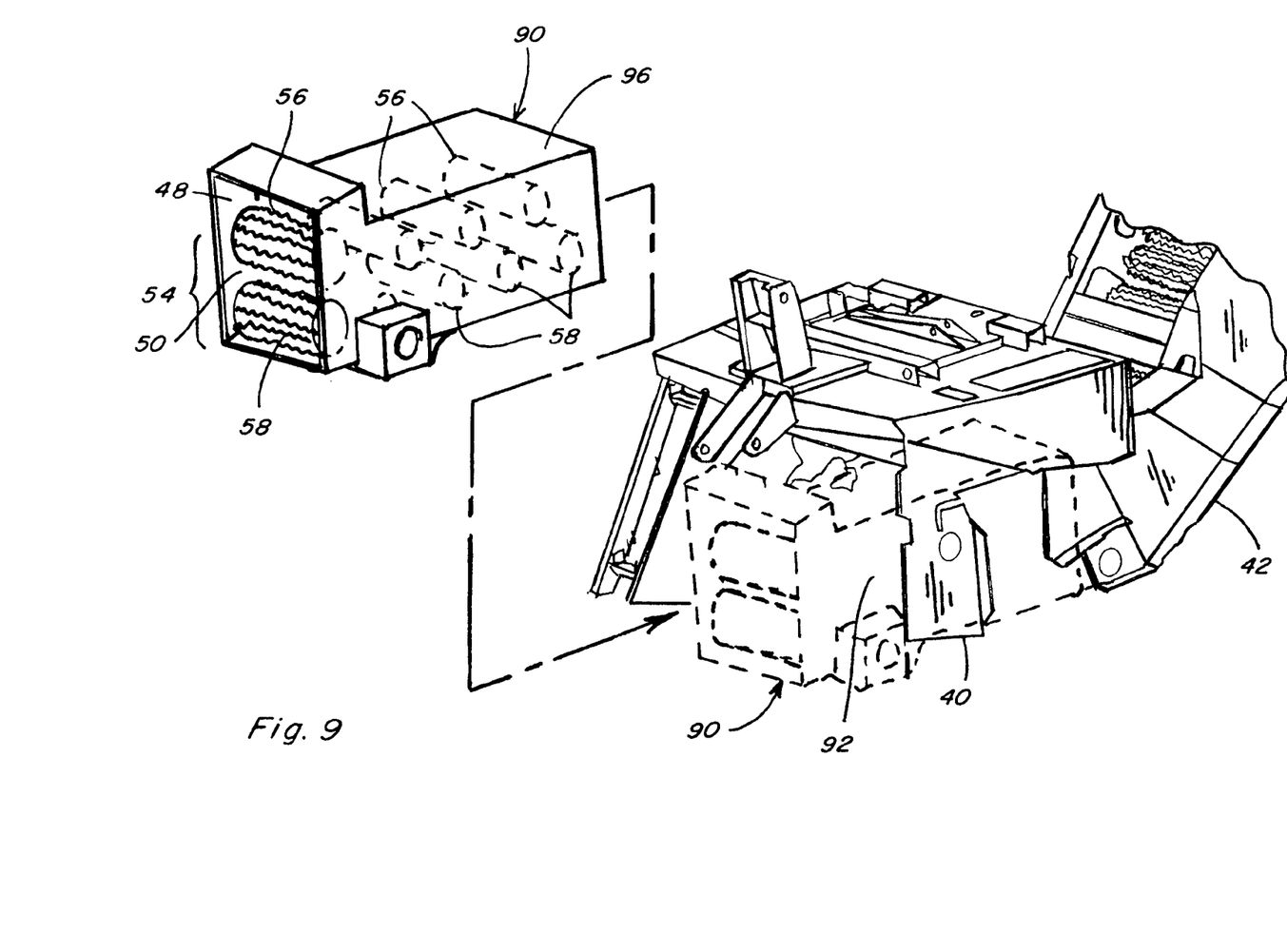
FIG. 9 is a simplified fragmentary schematic perspective view of the sugarcane harvester of FIG. 8, showing a manner of installation of a transfer roller unit of the invention in the harvester.
Figure 10:
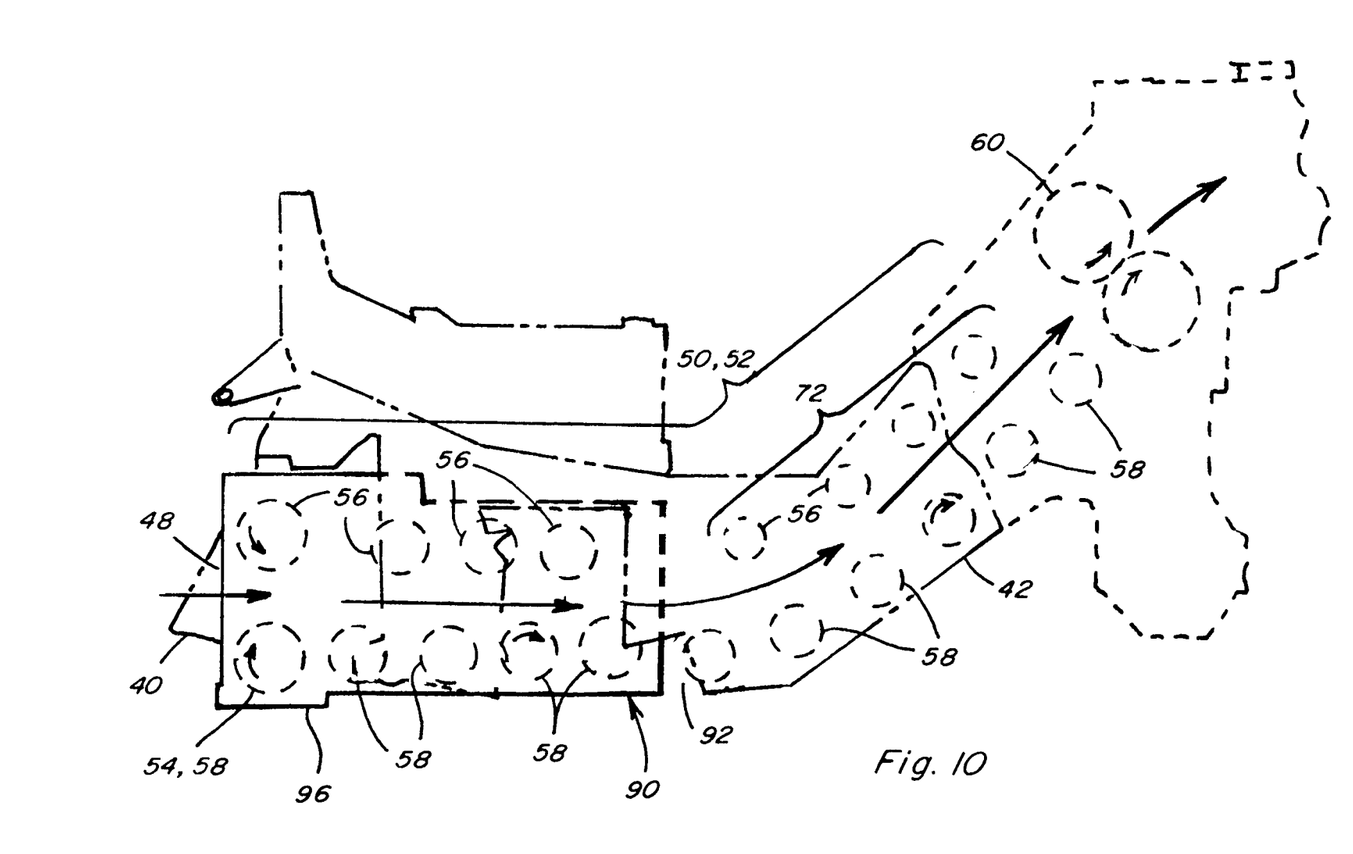
FIG. 10 is a simplified schematic side view of the sugarcane harvester of FIGS. 8 and 9, showing the transfer roller unit of the invention installed in the harvester.

Referring also to FIGS. 9 and 10, transfer roller unit 52 includes a forward transfer unit module 90 that is installable in a cavity 92 of frame 42 essentially in place of base cutters 88 and related support structure, and can be secured in place in a suitable manner such as using fasteners, pins, and/or the like. Frame 42 is advantageously preferably configured for interchangeability of header 22 and module 90, with apparatus 84 and base cutters 88, for design and manufacturing efficiency, and to allow easily and conveniently selecting to configure the harvester with the row insensitive capability of the invention, or a row sensitive conventional configuration, e.g. for harvesting sugarcane only at set row spacings.

In a preferred embodiment, module 90 is housed in a package or container 96 of sheet metal or other suitable construction, includes inlet opening 48, forward roller set 54, and the upper and lower rollers 56 and 58 bounding and defining the horizontal section of feed passage 50. Essentially, module 90 fills the gap in frame 42 between header 22 and inclined lifting conveyor 72 and provides a manner of conveying the flow of cut stalks and foliage received from the header to the inclined conveyor, while preferably also vertically compacting the flow to at least some extent.

Figure 10A:
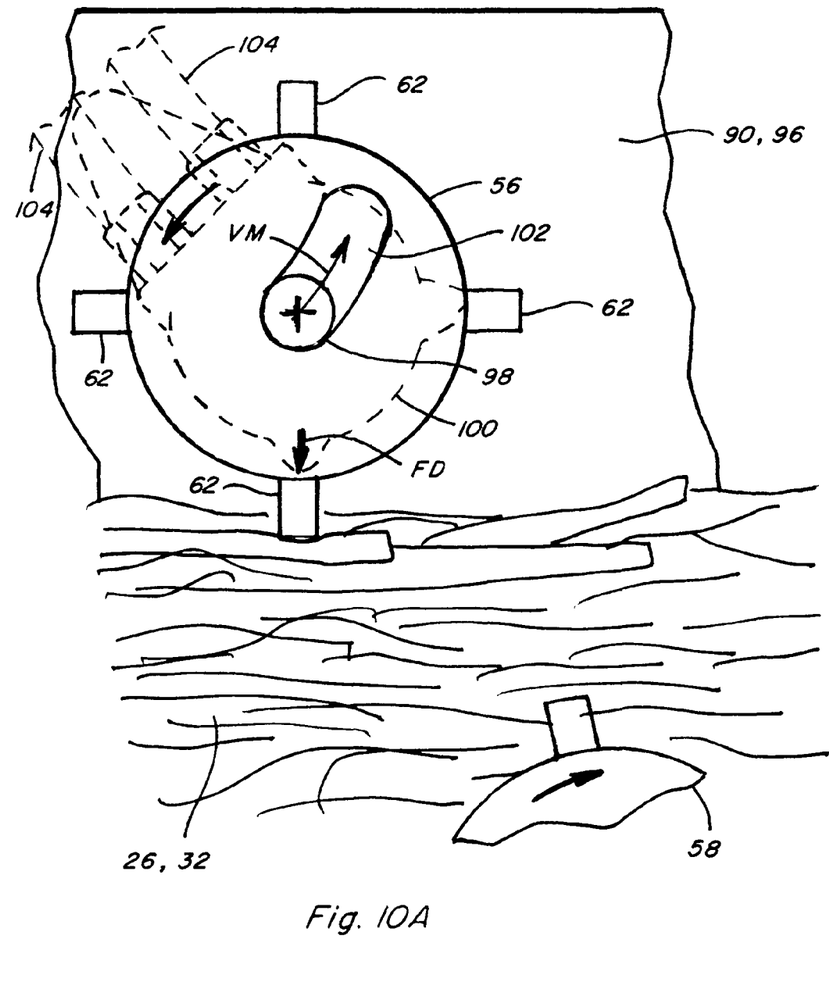
FIG. 10A is a fragmentary side view of a forward transfer roller unit module of the invention, showing a representative vertically movable transfer roller and a representative drive associated therewith.
Figure 10B:
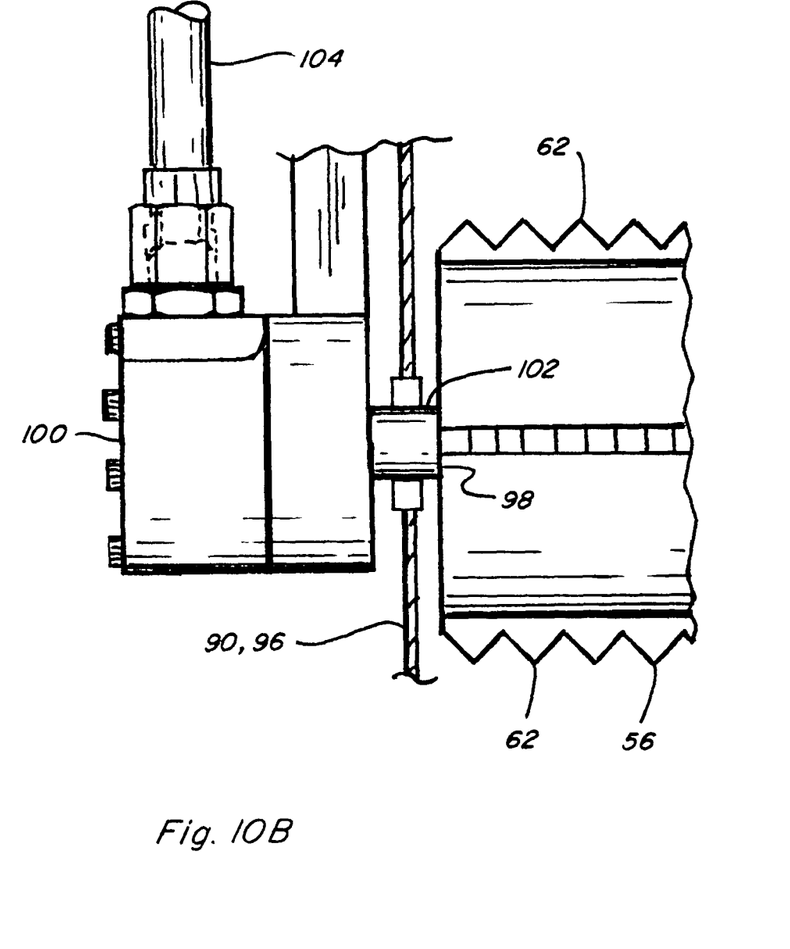
FIG. 10B is a fragmentary sectional view through a side sheet of the module of FIG. 10A, showing the transfer roller and drive.

Referring also to FIGS. 10A and 10B, and discussed above, some or all of rollers 56 and/or 58 can be optionally vertically movable as denoted by arrow VM, to provide flexibility for accommodating different heights or thicknesses of flow 28, and for exerting the desired force FD against the flow, if desired or required. In this regard, as one manner of accomplishing this capability, the ends of a roller 56 can be supported on a shaft 98 extending through slots 102 through side sheets of container 96 of module 90 so as to be movable along the slot. A drive 100 in connection with shaft 98 can be located external to container 96, and can be counterbalanced on the opposite side of the roller by a weight or the like. Drive 100 can comprise a fluid motor connected to a pressurized fluid system (e.g., control valves 106 in FIG. 11), of harvester 20 by fluid lines 104, or can alternatively comprise an electric motor, drive sprocket or sheave of a chain or belt drive, a gear box, or the like. Drive 100 can be suitably mounted to allow movement VM, such as by an offset pivotal connection to container 96.

Figure 11:
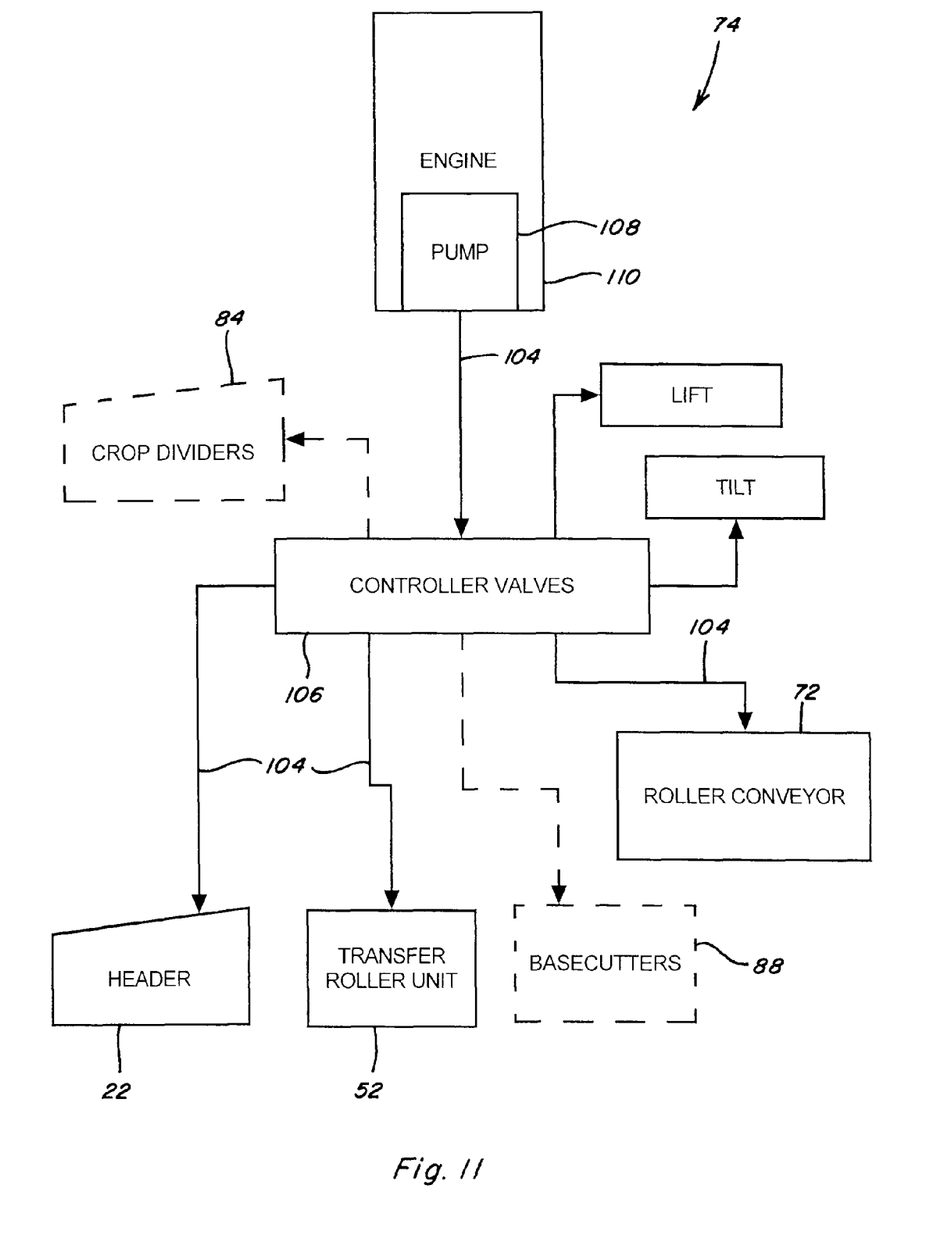
FIG. 11 is representative system diagram of the harvester of FIGS. 8-10, illustrating interchangeability of aspects of the invention for aspects of the prior art cane harvester.

Referring also to FIG. 11, as mentioned above, as another advantage of the row insensitive harvesting and billeting system of the invention, elements of the system can be powered by a standard propulsion and power system 74 of a conventional harvester such as a sugarcane harvester, interchangeably with normal elements of such harvesters. As a non-limiting example, for a fluid powered system, header 22 can be controllably powered via fluid lines 104 connected to controller valves 106 supplied with pressurized fluid by a pump 108 driven by an engine 110 of the harvester, in place of the row dividers used for row sensitive harvesting, and other apparatus for cutting or inducting canes 86; at least aspects of transfer roller unit 52 can be controllably powered via lines 104 in connection with valves 106 in place of base cutters 88; while inclined conveyor 72 and the billet cutter can be normally powered via fluid supplied through lines 104. Flow rates and other operating parameters can be controllably adjusted and set as needed to accommodate the different power demands and operating characteristics of the various aspects of the present system.

In light of all the foregoing, it should thus be apparent to those skilled in the art that there has been shown and described a row insensitive biomass harvesting and billeting system and method embodying the present invention. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A biomass harvesting system, comprising:
a frame supporting plant cutting apparatus configured to cut stalks or canes of plants adjacent to a ground surface as the frame moves forwardly thereover, a billet cutter configured to cut the stalks or canes into billets, and an upwardly and rearwardly extending lifting conveyor carried on the frame and configured to convey the cut stalks or canes upwardly to the billet cutter;
the plant cutting apparatus being carried on a forwardmost portion of a header extending forwardly of and external to the frame and configured to simultaneously cut the stalks or canes of multiple plants spaced at any distance apart within a sideward width of the forwardmost portion of the header, in combination with gathering apparatus carried on the header configured to gather the cut stalks or canes forwardly and externally of the frame and to direct the gathered stalks or canes in a generally continuous, overlaying flow into a cavity of the frame, and a transfer roller unit including a plurality of transfer rollers disposed in the cavity between an inlet opening and the lifting conveyor, configured to increasingly compact the flow of the gathered stalks or canes into a generally flat mat and to convey the mat to the lifting conveyor for conveyance thereby to the billet cutter.

2. The biomass harvesting system of claim 1, wherein the transfer roller unit comprises an array of lower rollers and upper rollers, arranged in a vertically offset manner defining a generally horizontal feed passage therebetween, wherein at least some of the upper rollers are vertically movable to accommodate different heights of the flow of the gathered stalks or canes.

3. The biomass harvesting system of claim 1, wherein the transfer roller unit comprises at least three powered upper transfer rollers configured to exert a downward force against the overlaying stalks or canes to vertically compact the stalks or canes.

4. The biomass harvesting system of claim 3, wherein the three powered upper transfer rollers are disposed above at least four powered lower transfer rollers of the transfer roller unit, configured to support the flow of gathered stalks or canes as the upper transfer rollers exert the downward pressure.

5. The biomass harvesting system of claim 1, wherein the transfer roller unit comprises a removable module carried in the cavity forwardly of the lifting conveyor.

6. The biomass harvesting system of claim 5, wherein the transfer roller unit is configured to be substantially interchangeable with a rotary base cutter of an other biomass harvesting system installable on a frame of the other biomass harvesting system.

7. The biomass harvesting system of claim 6, wherein the transfer roller unit is configured to be powered by a fluid system interchangeably with the base cutter of the other biomass harvesting system.

8. The biomass harvesting system of claim 1, wherein the frame is self-propelled.

9. A biomass harvesting system, comprising:
a self-propelled frame configured to move in a forward direction over a ground surface and including a forward end and a cavity rearwardly thereof;
a row insensitive plant cutting header carried on and extending forwardly of the forward end of the frame, the header carrying plant cutting apparatus across a forward end thereof configured and operable to simultaneously cut multiple plant stalks or canes from the ground surface at any locations across the forward end of the header, respectively, as the header is moved forwardly over the ground surface, the header including gathering apparatus configured to operate in cooperation with the plant cutting apparatus to mix and gather the multiple cut stalks or canes together in overlaying relation and to direct the overlaying stalks or canes in a continuous flow rearwardly to the frame;
a plurality of transfer rollers disposed in the cavity of the frame bounding a feed passage positioned to receive the continuous flow of stalks or canes from the header, the transfer rollers being configured to increasingly vertically compact and convey the flow rearwardly through the feed passage to a rear end of the frame, the transfer rollers including a forwardly located transfer roller unit bounding a forward region of the feed passage and configured and positioned to receive the flow from the gathering apparatus, and a rearwardly located lifting conveyor bounding a rear region of the feed passage and configured and positioned to receive the flow from the transfer roller unit and convey the flow to a billet cutter located adjacent to a rear upper end of the lifting conveyor.

10. The biomass harvesting system of claim 9, wherein the plant cutting apparatus comprises a plurality of generally horizontal rotating disks having radially outwardly extending knives on an outer circumference thereof, positioned such that the knives rotate across the sideward width of the header between a plurality of forwardly extending guards.

11. The biomass harvesting system of claim 9, wherein sections of the flow comprise at least three overlaying stalks or canes, and the transfer roller unit comprises at least seven powered, serrated rollers arranged in a horizontal alternating pattern configured to vertically compact the overlaying stalks or canes en route to the lifting conveyor.

12. The biomass harvesting system of claim 9, wherein the transfer roller unit is configured as a modular structure mounted to the frame forwardly of the lifting conveyor.

13. The biomass harvesting system of claim 12, wherein the transfer roller unit is configured to be substantially interchangeable with a rotary base cutter unit of an other biomass harvesting system.

14. The biomass harvesting system of claim 9, wherein the lifting conveyor is configured to vertically compact the flow gradually as the flow approaches the billet cutter.

15. The biomass harvesting system of claim 9, wherein the header is configured to be substantially interchangeable with a row divider unit of an other biomass harvesting system and installable on the forward end of the frame of the other biomass harvesting system.

16. The biomass harvesting system of claim 9, comprising a hydraulic system configured for interchangeable connection with the transfer roller unit and a base cutter unit of an other biomass harvesting system.

17. A row insensitive biomass harvesting and billeting method, comprising steps of:
simultaneously severing in a continuous manner multiple plant stalks or canes at a time from a ground surface, across a forward end of a row insensitive plant cutting header carried on a front end of a harvester;
laying down and gathering the severed stalks or canes in a continuous flow comprising at least three of the stalks or canes in overlaying relation;
inducting the flow into a feed passage extending rearwardly within the harvester to a billet cutter on a rear end of the harvester;
conveying the flow rearwardly through the feed passage to the billet cutter;
pressing down on the flow to increasingly vertically compact the overlaying stalks or canes while the conveying step is being carried out; and
cutting the overlaying stalks or canes of the flow into billets using the billet cutter and discharging the billets from the harvester.

18. The method of claim 17, wherein the pressing step includes compacting the flow so as to have a vertical extend corresponding to a vertical extent of a gap between rotating elements of the billet cutter.

19. The method of claim 17, wherein the the pressing step is accomplished by way of a downward pressure exerted by elements of a lifting conveyor that conveys the flow into the billet cutter.

* * * * *